INVENTOR
BERNARD P. HAAS

BY Watson, Cole, Grindle & Watson

ATTORNEYS

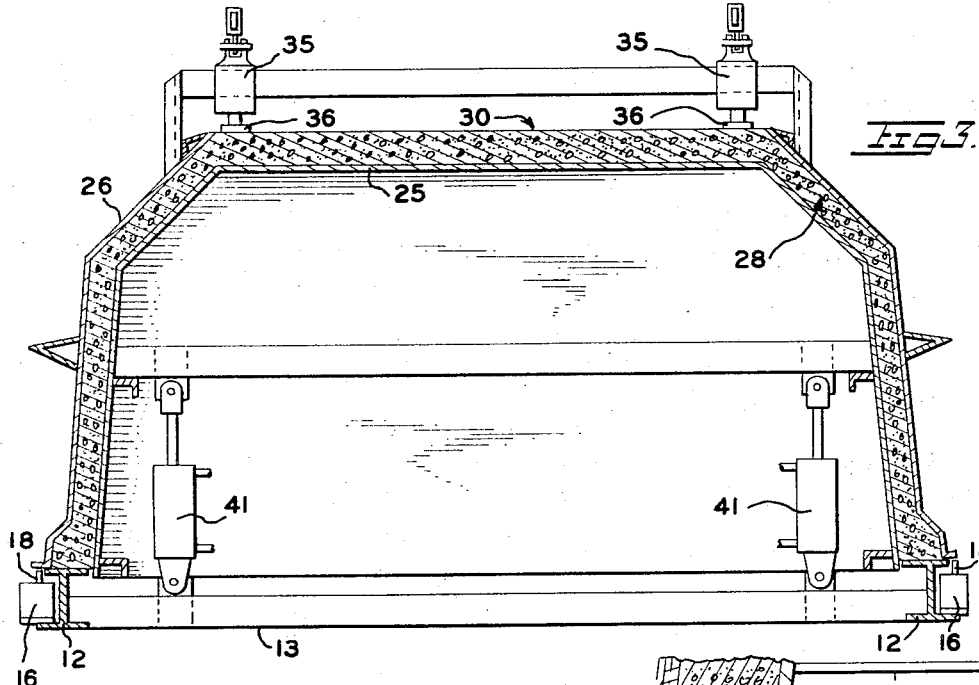
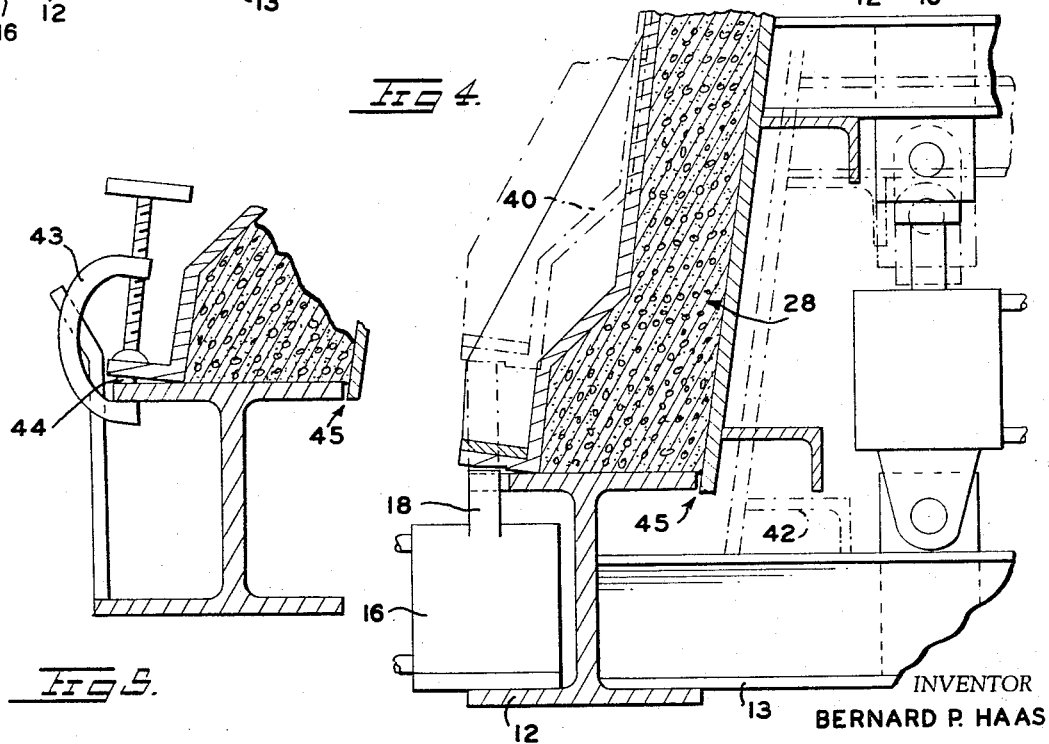

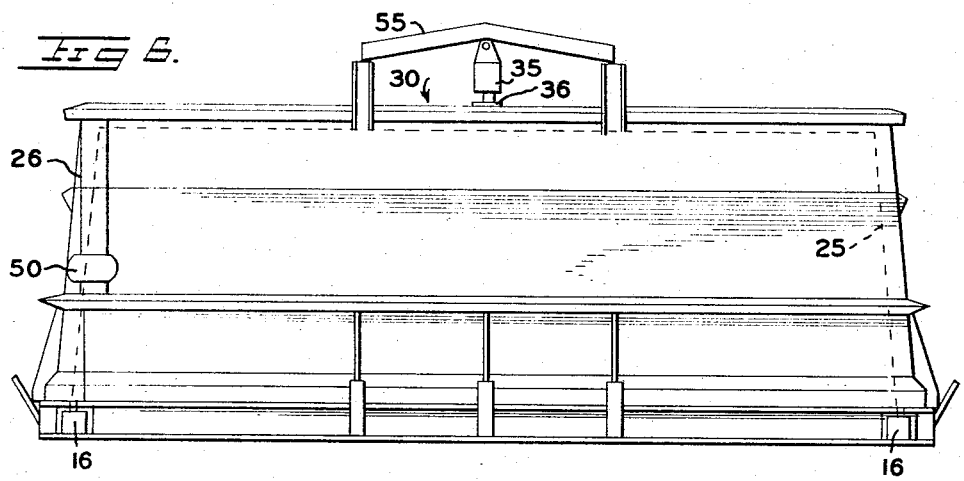
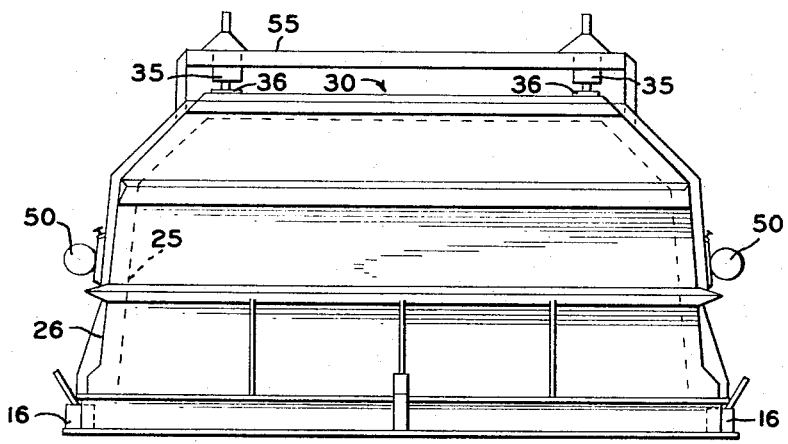
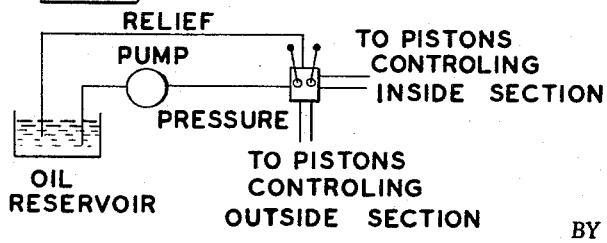
INVENTOR
BERNARD P. HAAS
BY Watson, Cole, Grindle & Watson
ATTORNEYS

United States Patent Office 3,297,295
Patented Jan. 10, 1967

3,297,295
APPARATUS FOR REMOVING FORMS FROM LARGE CONCRETE TANKS HAVING A BOTTOM
Bernard Peter Haas, Bradenton, Fla., assignor to Defiance Incorporated, Bradenton, Fla., a corporation of Florida
Continuation of application Ser. No. 287,855, June 14, 1963. This application Jan. 7, 1966, Ser. No. 533,740
2 Claims. (Cl. 249—66)

This application is a continuation of Serial No. 287,855, filed June 14, 1963, now abandoned.

This invention relates to aparatus for casting concrete, and more particularly it relates to casting and curing large hollow concrete bodies such as sewage tanks.

When large tanks are cast of concrete, prior art methods and apparatus have required extensive molding and handling equipment, with a considerable amount of labor, and the curing time required has extended over a long period of time. In some cases extensive superstructures and handling equipment have been provided for handling green (uncured) cement bodies. In most cases the molding apparatus could not be removed from the concrete until a significant amount of curing had progressed, to avoid the danger of weakening or cracking the cement. The molds themselves have been of such design that their removal would put undue stresses and strains on uncured concrete.

It is accordingly an object of the invention to provide improved apparatus for casting and curing hollow concrete bodies, such as large tanks.

Another object of the invention is to provide apparatus for hastening the curing cycle of molded concrete.

A further object of the invention is to provide apparatus for more efficiently producing large cast concrete bodies in a short period of time without deteriorating from quality.

Another object of the invention is to provide simplified molding apparatus for large cast concrete bodies.

In accordance with the invention therefore, a concrete tank is formed in inverted or domed position between inner and outer mold sections shaped substantially as inverted cups with inclined side sections. The lower periphery of the tank is held immovably in place on a base plate, so that the inner and outer mold sections may be removed without changing the position of the cement. This permits mold removal when the cement is green, and the inclined walls afford telescoping action of the mold sections so that little strain is introduced on the cement body during the removal. By lifting the outer mold section first, the tank may be restrained from motion upwardly as the form is being lifted without incurring damage by pressing downwardly against the green cement in the topmost region supported by the inner mold section. The inner mold section may thereafter be removed downwardly while the cement body is held in fixed position on the base plate. Accordingly, the cement body may continue to cure faster in air and the molding equipment is released more quickly for use in casting further tanks.

Further objects and features afforded by the invention will be found throughout the detailed specification which is made with reference to the accompanying drawings, wherein:

FIGURE 3 is an elevation in section of the mold assembly of FIGURE 2 taken along section lines 3—3;

FIGURE 4 is a detail section view of a portion of the mold assembly of FIGURE 3 taken along section lines 4—4 showing in phantom view the mold section removal phase;

FIGURE 5 is a further detail section view indicating the mold assembly in use during the cement pouring phase;

FIGURE 6 is a side elevation view of the molding apparatus;

FIGURE 7 is a front elevation view of the molding apparatus; and

FIGURE 8 is a schematic representation of a hydraulic system as used in accordance with the teachings of the invention.

Figure 1:
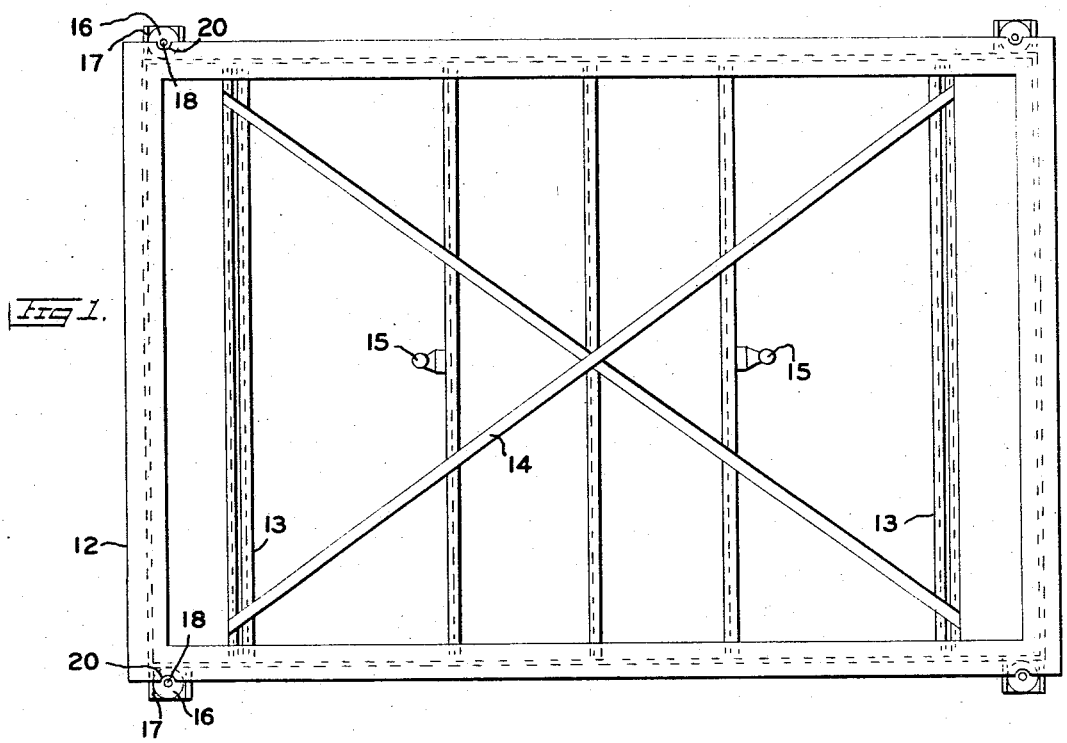
FIGURE 1 is a top plan view of a base section for supporting the lower periphery of a concrete tank cast in accordance with the teachings of this invention.

The described embodiment of the invention provides for casting a large concrete tank substantially rectangular in cross-section that is approximately eight feet wide, twelve feet long, and four feet deep. In FIGURE 1, the base section holds the inverted tank during the casting and curing process. A base plate 12 rests under the entire periphery of the tank disposed in inverted position to provide an immovable support to the entire concrete mass of the tank body, which precludes movement until adequate curing has taken place. The base section is provided with sufficient braces 13 and struts 14 to prevent any sagging due to the great weight of such a large concrete body, since any slight shearing force tends to crack or weaken green concrete.

In order to hasten the curing process, heat radiators 15 are disposed to face the inner surface of the tank when inverted on the base plate 12.

On each of the four corners of the base assembly is located a double-acting hydraulic piston assembly 16 or other force producing mechanism. The mechanism rests on a frame member 17 affixed to the base frame so that the plunger rod 18 may extend through the base plate 12 at its outer edge (as shown through arcuate indentation 20) to thereby raise the outer mold section 26 normally upwardly from the base in the manner hereinafter explained. The base plates 12 may be I beam members for example, as will be evident from other views.

Figure 2:
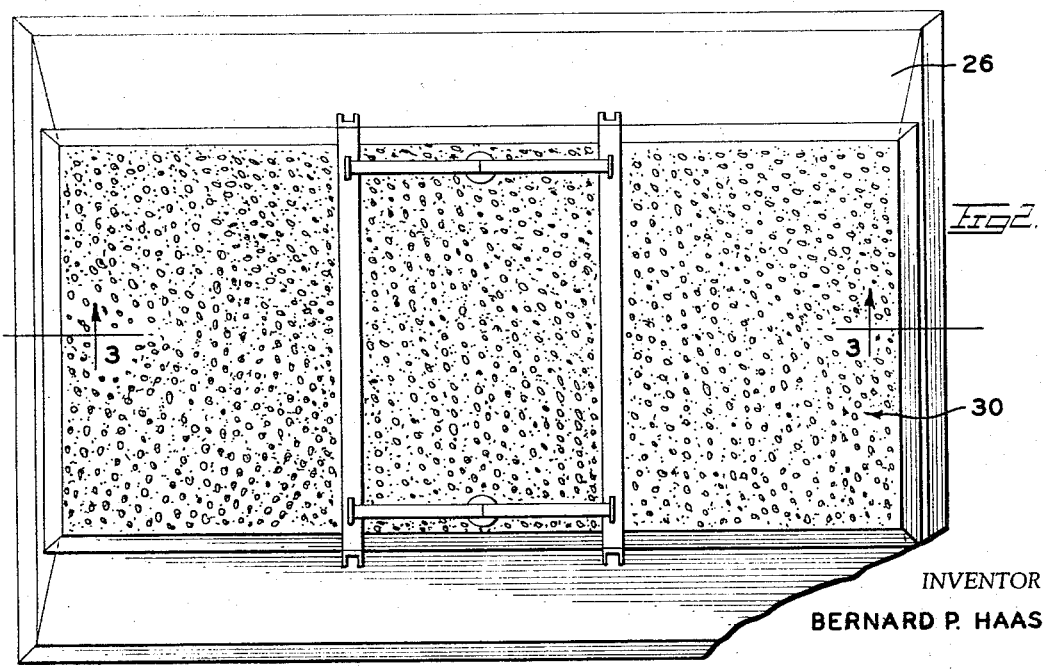
FIGURE 2 is a top plan view of a mold assembly of the invention.

Upon this frame the entire mold assembly and cast concrete tank is rested in the manner shown by the remaining figures. The general relationship of the molds is shown in the views of FIGURES 2 and 3, wherein the inner inverted cup shaped mold section 25 is disposed within the outer complementary mold section 26. The side walls of each of these mold sections are inclined to provide a telescoping action when the mold sections 26 and 25 are removed respectively in the upward and downward directions. Thus, the mold sections may be removed before the concrete is cured and after an exceedingly short initial set period without damage to the concrete body 28, which rests in an immovable position upon base plate 12.

The outer mold section 26 has an upper opening 30 to permit pouring of cement and to permit manual inspection and troweling of the top surface after the pouring phase is completed. Optional complementary hydraulic lifting means comprising pistons 35 has pusher plates 36 adapted to rest on the upper surface of the inverted concrete tank.

The lifting cycle of the outer mold section 26 may be viewed in FIGURE 4, where the raised position is shown in phantom view 40. Thus, the hydraulic pistons 16 and 35 are actuated simultaneously by the hydraulic system of FIGURE 8, which provides separate controls 36, 37 for hydraulic operations used to remove the outer and inner mold sections respectively in sequence.

Similarly, the inner mold section 25 is removed by action of hydraulic pistons 41 which serve to pull the inner mold 25 downward. The resulting position where the inner mold section 25 is drawn downward to rest upon the I beam 12 is shown in phantom view 42 in FIGURE 4.

During the phase of filling the molds with cement, the clamps 43 of FIGURE 5 may be used to prevent the outer mold from floating upwardly on the cement. A Neoprene seal 44 is used to seal the joint. The inner joint 45 telescopes tightly into place and thus may be withdrawn downward without requiring a further sealing member.

As the outer mold member 26 rests by gravity on the base 12, the angularly disposed guide plates tend to center the outer section on the base. The telescoping action of the inner mold member 25 serves to center it by way of the inner moving joint 45.

As may be seen from FIGURES 6 and 7, a plurality of vibrator assemblies 50 is mounted on the sides of the outside mold 26 to help settle the cement uniformly between the molds as it is being poured in the opening 30.

The hydraulic piston assembly 35 as mounted on the framing 55 affixed to the outer mold is in position to aid the telescopic removal of the outer mold upwardly by pressing the plates 36 downwardly against the concrete at an early initial set which occurs without damage because of reinforcement effect of the inner mold 25, still in place.

In a typical casting cycle, the cement is poured into the opening 30 with vibrators 50 operating so that a uniform concrete body 28 is formed. After smoothing the open top portion manually and removing clamps 54, the top mold section 26 may be removed. This may be accomplished when the concrete is green because of the telescoping action of the molds against the concrete walls while the concrete body 28 is held in a stationary immovable position on the base member 12 partly by gravity and partly by force on pistons 35.

As the hydraulic system operates pistons 16 and 35, the outer mold member 26 is lifted from the outer inverted tank surface. After this is completed, the inner mold member 25 is lowered by action of the hydraulic pistons 41. In such operation the concrete is held in place by the I beam base plate members 12. Thus, the cement tank body 28 need not be moved until it takes a better cure in the presence of air and after being subject to the curing effect of the interior heat lamps 15. Thus, the present invention provides improved equipment for forming concrete tanks of high quality in a minimum of time. The molds may be used with much less labor required in stripping the forms than with conventional prior art methods. Since the concrete tank need not be moved during the demolding process, a much shorter cure time is necessary to avoid cracking the green concrete. Also, the telescoping design of the mold sections assures removal with little strain against the cement tank body. Accordingly, the state of the art is significantly improved by the novel apparatus defined with particularly in the following claims.

What is claimed is:

1. Apparatus for removing forms from heavy one piece hollow concrete tanks with at least one inch thick integral walls and closed bottom while the concrete is green, comprising in combination, a fixed base section having an immovable base plate comprising a peripheral frame for supporting the weight of a single said green tank body in inverted position about its perimeter walls, an inner telescoping substantially inverted cup-shaped form having tapered walls and disposed internally adjacent to the base plate to form the inner surfaces of the tank by receiving a charge of concrete forming the entire bottom and side surfaces of the tank, with the form being arranged to move downwardly normally to the base plate and inside the base plate frame to release the inner form from a molding position, means for applying a mechanical force between said inner form and the base plate to move the inner form downward on the base plate to position it away from the green concrete while it cures, an outer form complementary to said inner form forming the outer surfaces of the tank disposed on said base plate and enveloping the inner form with an upper open section for receiving concrete for filling the void between the two forms, further means for applying a mechanical force directly between the outer form and said base plate for moving the outer form upwardly normally off said base plate while the green concrete tank is held on the base plate solely by weight of the concrete to release at least one of the forms for further use during curing of the concrete tank body while it is at rest in the casting position on the base plate, supplemental means fixedly attached to the outer form including a frame disposed above the open top section of the concrete tank with at least one member disposed with a pusher plate resting against the green concrete of the upper surface of said closed bottom of the inverted tank while the inner mold is in place supporting the concrete bottom of the tank on the inner surface, and programmable control means for sequentially actuating first in unison the mechanical forces between said outer form and both the bottom of the tank and the base plate through said supplemental means and said further means, respectively, and secondly after the upper form is released to actuate the means for applying a mechanical force between the inner form and the base to move the inner form downward.

2. Apparatus for removing molds from heavy green concrete tank bodies having a closed bottom at least two feet across with extending side walls comprising in combination, a set of complementary inner and outer mold sections for forming the bottom and side walls of said concrete body, an immovable base plate receiving the tank body molded between said sections in inverted position about the lower perimeter of said side walls, means including a power unit for vertically moving the inner mold section downwardly by exerting force between the mold section and the base plate, means for vertically moving the outer mold section upwardly by exerting a first force between the outer mold section and said base plate and a second force between said outer mold and the bottom of said concrete body including respective first and second power units affixed respectively to the base plate and the outer mold to release the form for further use while the concrete is curing in position on said base plate and programmable force control means operable to sequentially actuate firstly the two power units in unison for moving the outer mold and thereafter the power units for moving the inner mold, whereby the inner mold is in place to support the green concrete bottom of the tank when said control means applies said second force to the bottom of the concrete body.

References Cited by the Examiner

UNITED STATES PATENTS

| | | | |
|---|---|---|---|
| 1,553,089 | 9/1925 | Livermore | 249—146 |
| 2,926,411 | 3/1960 | Steiro | 25—120 |
| 3,078,539 | 2/1963 | Duplessis | 25—120 |

J. SPENCER OVERHOLSER, *Primary Examiner.*

R. D. BALDWIN, *Assistant Examiner.*